Nov. 19, 1957 — T. M. McSHERRY — 2,813,675
MECHANICAL ANALOGUE COMPUTER FOR USE IN A POSITION INDICATOR
Filed May 11, 1955 — 2 Sheets-Sheet 1

INVENTOR
THOMAS M. McSHERRY
BY
ATTORNEYS

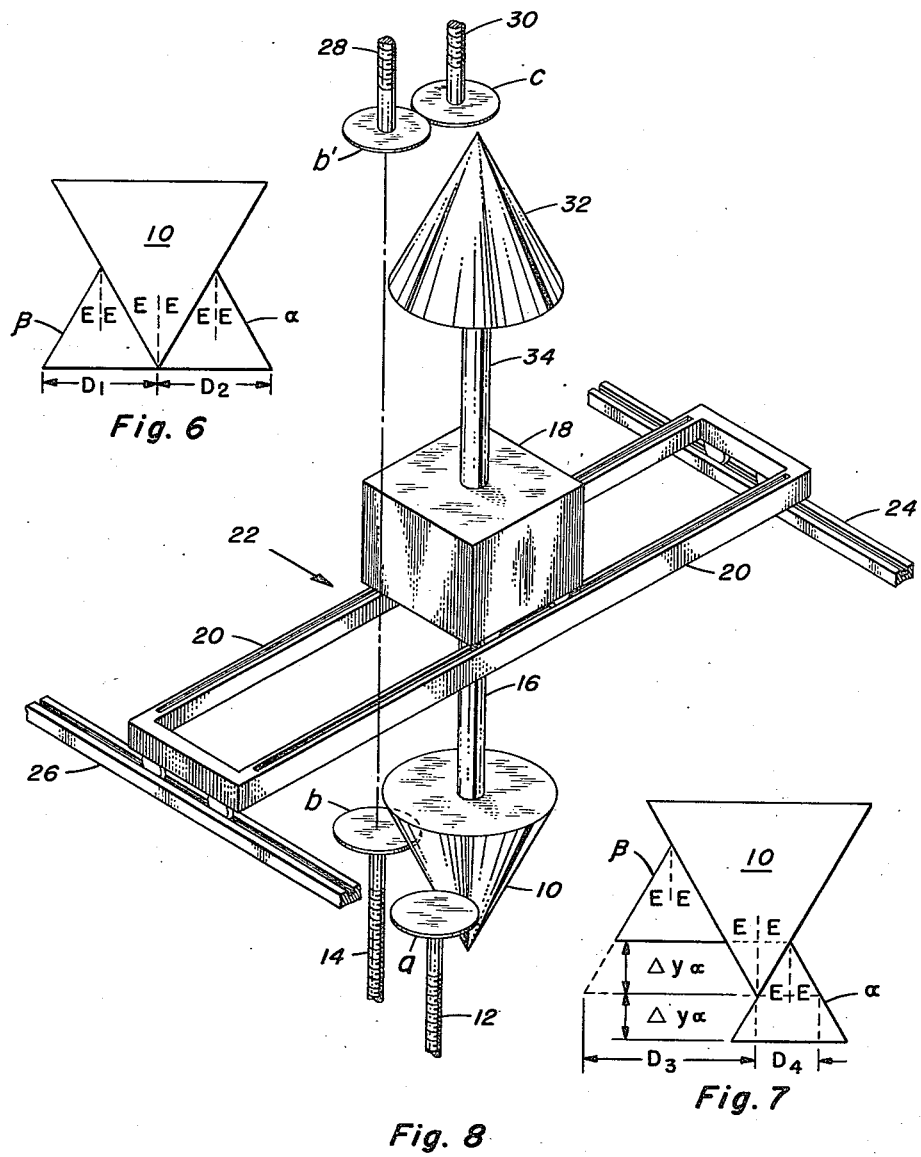

United States Patent Office 2,813,675
Patented Nov. 19, 1957

2,813,675

MECHANICAL ANALOGUE COMPUTER FOR USE IN A POSITION INDICATOR

Thomas M. McSherry, St. Paul, Minn.

Application May 11, 1955, Serial No. 507,756

19 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates to a mechanical analogue computer and more particularly to a mechanical analogue computer which may be used in conjunction with electromagnetic energy transmitters to determine the location of the computer and hence of the vessel or aircraft in which the computer is carried.

In one presently used system of navigation, two one-parameter families of hyperbolas with foci corresponding to transmitting station locations are laid off on a chart of the region. Location may be determined by ascertaining on which of each family of hyperbolas one is located, and determining their intersection by inspection. In this presently known system, one disadvantage is that all charts used must be plotted beforehand. Another disadvantage is that inaccuracy is introduced by interpolation between plotted members of the family. Also, a delay of approximately five minutes is involved between the time the basic information is obtained and the time a "fix" is made.

It is therefore an object of the present invention to provide an apparatus which will enable the position of a vessel or aircraft to be continuously determined.

Another object is to provide an apparatus which will enable one to determine one's position with a minimum delay between the time the basic information is obtained and the time the position is determined.

A further object of the invention is the provision of a more accurate means for determining position.

Still another object is to provide a position computer which will eliminate the need for prior plotting of charts.

Other objects and many of the attendant advantages of this invention will be readily appreciated as the same becomes better understood by reference to the following detailed description when considered in connection with the accompanying drawings wherein:

Fig. 6 is a view of part of another embodiment, Fig. 7 is another view of the second embodiment, and Fig. 8 is a diagrammatic side view of one embodiment of the invention.

Figure 1:
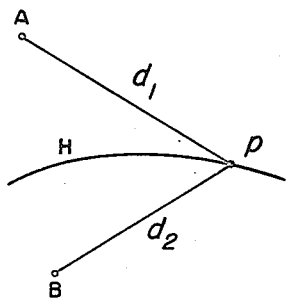
Fig. 1 is a diagram illustrating the nature of a hyperbola.

Referring now to the drawings, A and B are fixed points (foci), and $p$ is another point. The distance between point $p$ and foci A and B is represented by lines $d_1$ and $d_2$, respectively. If point $p$ is moved along curve H so that the differences of the distances $d_1$ and $d_2$ is constant, then curve H is a hyperbola. Mathematically expressed, $d_1 - d_2 = k$ (a constant). By varying the value of $k$, an infinite number of hyperbolas may be drawn with respect to the two foci A and B.

Figure 2:
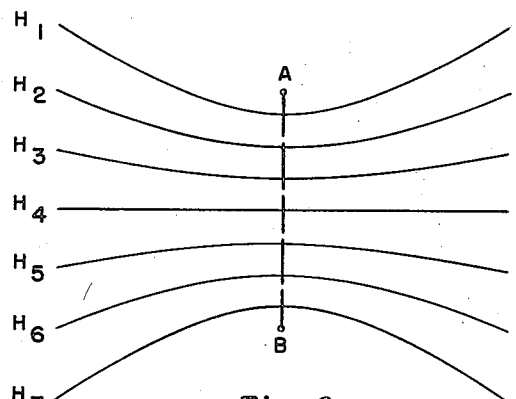
Fig. 2 shows a family of hyperbolas for the foci A and B.

Fig. 2 shows a number of hyperbolas, $H_1, H_2, \ldots H_7$ drawn with respect to foci A and B, and hence constitute a family of hyperbolas.

Figure 3:
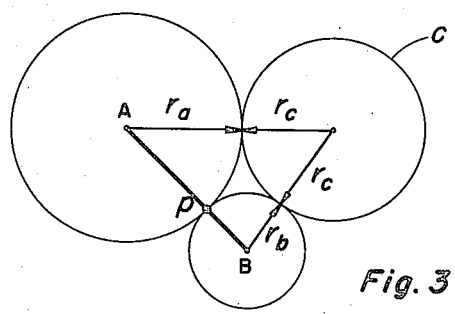
Fig. 3 is another diagram illustrating the nature of a hyperbola.

Fig. 3 illustrates a method by which a hyperbola may be generated. Points A and B are established, line AB drawn and point $p$ selected thereon. With A as the center, a circle is drawn through point $p$, having a radius $r_A$. A second circle is drawn through point, with B as center, and having a radius $r_B$. A third circle C is drawn having any radius $r_C$, circle C being tangent to the other two circles. Obviously, an infinite number of circles may be drawn which are tagent to the other two circles. The centers of these circles will lie along a hyperbola, as will be demonstrated hereafter.

Recalling that in Fig. 1, $d_1 - d_2 = k$, it may be seen that $d_1 = r_A + r_C$ and that $d_2 = r_B + r_C$; substituting, $$(r_A + r_C) - (r_B + r_C) = K,$$

or $$r_A + r_C - r_B - r_C = K$$

This then becomes $r_A - r_B = k$, the original expression for the hyperbola. Hence, the center of any circle tangent to circles A and B will lie on a hyperbola. If the third circle is considered as expanding from a point, the locus of its center(s) will define a hyperbola.

Suppose now that transmitters are located at A and B of Fig. 2, and periodically and simultaneously sent out pulses. With suitable equipment these pulses can be received and the time interval between pulse arrivals measured. A time interval between pulse arrivals indicates that the receiver is closer to one station than the other by an amount proportional to the measured interval. This locates the position of the receiving apparatus as being along a particular hyperbola of the family AB. By utilizing another station as at C (see Fig. 4), the position can be determined as being along one of the hyperbolas of the family BC. The intersection of the two hyperbolas indicates the position.

There is presently available equipment which will receive pulses from two stations, and measure and indicate the time lag automatically. The instant invention utilizes this data to obtain automatically the position of the receiving apparatus, and is based upon the principle illustrated by Fig. 3 and the discussion pertaining thereto. Otherwise stated, the invention may be described as a mechanical analogue of the plane geometry of Fig. 3.

The circles A and B of Fig. 3 may be represented by two co-planar, tangent discs, $a$ and $b$. The third circle, C, which may be considered as an expanding circle, may be represented by a right circular cone with its axis perpendicular to the plane of the discs $a$ and $b$. Suppose the cone to be placed point downwards, and the point of the cone at the point of tangency of the discs. By maintaining the axis of the cone perpendicular to the plane of the discs, moving the cone downwards, and keeping it in contact with (tangent to) the two discs, a mechanical analogue of the Fig. 3 geometry (an expanding circle tangent to two tangent circles) is obtained. The axis of the cone will therefore describe a path which is a hyperbola. It will be understood that the above is descriptive of a mechanical analogue of the hyperbola for one value of $k$ of the AB family, and hence of one hyperbola of the family.

Figure 5:
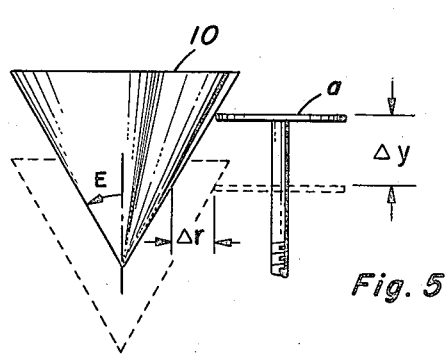
Fig. 5 is a view of part of one embodiment of the apparatus.

Another curve of the family AB may be obtained for another $k$ value, in which case point $p$ (Fig. 3) would be displaced along line AB, towards either A or B. New circles would then be drawn through the point, their radii varying inversely by equal amounts. The mechanical analogy of this radius variation may be accomplished by giving equal and opposite vertical motions to the two discs $a$ and $b$; i. e. discs $a$ and $b$ are moved to two planes parallel to their original plane and equidistant therefrom. This may be visualized by reference to Fig. 5, wherein there is shown a downwardly pointed right circular cone 10 and a disc $a$. If disc $a$ is moved vertically a distance $\Delta y$ to the dotted line position, the cone 10 may be moved down so that it again contacts disc $a$, the new position of the cone 10 being shown in dotted lines. The horizontal distance which the edge of disc $a$ travels, as "seen" by the cone, is equivalent to a change in radius of the disc, and is represented by $\Delta r$. If the apex angle of the triangle from which cone 10 is generated is represented as E, then $\Delta r_a = \Delta y_a \tan E$. Assuming that a second disc $b$ (not shown) moves upwardly a distance $-\Delta y$ then the radius increase of circle B is represented by $-\Delta y_b \tan E$, or $\Delta r_b = -\Delta y_b \tan E$. Since $\Delta y_a$ equals $\Delta y_b$, and since angle E is constant, $\Delta r_a = -\Delta r_b$. Hence, by moving the discs equal distances in opposite directions, the mechanical analogy is that of varying the radii of circles A and B inversely by equal amounts, and thus of obtaining another hyperbola of the AB family.

Another mechanical analogy may be obtained by utilizing two cones in place of the two discs. Such an arrangement is illustrated in Fig. 6, wherein there is shown the downwardly pointed right circular cone 10 and two upwardly pointed right circular cones $\alpha$ and $\beta$. The effective disc diameters are the base diameters, $D_1$ and $D_2$. If the cones $\alpha$ and $\beta$ are given equal and opposite vertical displacement, the geometry will be as is shown in Fig. 7, wherein $\Delta y$ is the vertical displacement of one cone, the total relative vertical displacement being $2\Delta y$. The effective disc diameters now are $D_3$ and $D_4$, and a geometrical analysis as in the case of the discs may be made. Thus, there is obtained a construction in which the apparatus will function closer to a transmitter station, as the point $p$ can, by analogy, approach closer to the transmitter station A or B. In the construction using discs, it will be understood that the disc diameter and relative scale would restrict the movement of point $p$, whereas with the use of cones point $p$ can approach and lie contiguous to transmitter A or B. Additionally, the use of cones permits the crossing over of the cone 10, from one side of line A—B (see Fig. 2) to the other side, along a hyperbola.

Referring now to Fig. 8, there is shown two discs $a$ and $b$ and a cone 10 in contact therewith. Discs $a$ and $b$ are supported by screw-threaded shafts 12 and 14, respectively. Shafts 12 and 14 may be rotatably supported in suitable housings (not shown) and so driven that the shafts 12 and 14 are given equal and opposite rotation. As the threading of the two shafts is identical, vertical movement imparted to discs $a$ and $b$ will be equal and opposite. Cone 10 is mounted upon support rod 16, which is mounted in housing 18. The axis of support rod 16 coincides with the axis of cone 10. Cone 10 may be moved to or from housing 10, i. e. raised or lowered, by a pinion in housing 18 engaging with a rack (not shown) on rod 16. Housing 18 is supported for movement in one plane between tracks 20 of a travelling crane 22. Crane 22 is moveable along rails 24, 26. Hence, by proper gearing and motors, the axis of support rod 16 may be brought to any point within the rails 24, 26, and cone 10 is thus given three degrees of freedom of motion.

A second set of discs, $b'$ and $c$, are provided above housing 18. Discs $b'$ and $c$ are mounted on screw threaded shafts 28 and 30, respectively. Shafts 28 and 30 are rotatably supported in the same manner as shafts 12 and 14, and shafts 14 and 28 lie on the same line. A cone 32 is provided to coact with discs $b'$ and $c$, and is supported by support rod 34. Preferably, cone 32 is urged upwardly by a light spring pressure, so that it tends to continually contact one of the discs $b'$ or $c$. It will thus been seen that each of the cones has a defined space in which it is positionable. The shafts 12, 14, 28 and 30, with their discs, are positioned within these spaces.

In operation, the $a$ and $b$ discs simulate two pulse transmitting stations. Hence, shaft 12 of disc $a$ is positioned in line with the point on a map of the area being navigated which corresponds to transmitter A, as in Fig. 4, and shaft 14 of disc $b$ is positioned in line with the point on the map which corresponds to transmitter B in Fig. 4. Similarly, shafts 28 and 30 are positioned to aline with points corresponding to transmitters B and C, respectively. Known receiving equipment receives pulses from the two stations and determines the time lag between a pulse from each, the two pulses having been transmitted at the same instant. The time lag is fed by mechanical analogy to the shafts 12 and 14, so that the amount of rotation given each of them is the same and is proportional to the lag. The directions of rotation, it will be recalled, are opposite for the two shafts, with the result that one of the two discs ($a$ or $b$) moves in one direction and the other moves in the opposite direction an equal amount. This movement is analogous to establish a point $p$ on the AB axis (see Fig. 3). Cone 10 could start with its point at a relatively high point, the cone could be fed down, and the axis of the cone (shaft 16) would describe a hyperbola, so long as cone 10 is in contact with discs $a$ and $b$. Thus, there has been simulatively established the one hyperbola of the family of hyperbolas between transmitter at A and B on which the apparatus lies.

Similarly, the time interval between pulses from transmitters B and C (see Fig. 4), may be fed to shafts 28 and 30, so that equal and opposite vertical movements are imparted to discs $b'$ and $c$. This movement is analogous to establishing a point on the BC axis, and hence when cone 32 is in contact with discs $b'$ and $c$, the axis of the cone 32 would be simulatively established on a hyperbola of the family of hyperbolas between transmitters B and C. At the point at which the two cones 10 and 32 are in contact with the four discs $a$, $b$, $b'$ and $c$, the axis of the shafts 16 and 34 would simulatively lie on the point at which the equipment is located, i. e., at the intersection of the two hyperbolas.

It may be convenient to consider shafts 16 and 34 as being independent of each other, and each cone tracing out the hyperbola established by its associated discs. Hence cone 10 would trace out the hyperbola established by the position of discs $a$ and $b$ and cone 32 would trace out the hyperbola established by the position of discs $b'$ and $c$. Obviously, when the axis of the two cones lay along the same vertical line, the point of intersection of the hyperbolas is established, and therefore the simulated position of the apparatus.

In practice, the coincidence of two vertical axes is difficult to obtain; hence, in the present invention, the shafts 16 and 34 are mounted in vertical alinement, and the point of intersection of the hyperbolas determined by the contacting of the four discs by the two cones. Conveniently, upon this occurrence, an electric circuit could be completed which would stop all motors, so that the contact position would be maintained. Position could then be read from a chart which might be positioned in a horizontal plane either above cone 32 or below cone 10.

When new data is received from the receiving apparatus, and the discs adjusted in response thereto, contact will obviously be broken. The various driving motors would then be started and the cones "hunt" the discs until contact is re-established. By the use of proper sensing devices giving direction to the shafts 16 and 34, to the crane 22 and to the housing 18, the position will be established continuously and automatically.

In the case of an analogue computer having cones in place of the discs $a$, $b$, $b'$ and $c$, the functioning is substantially the same as described for the construction with the discs, but with the further operational advantages above noted.

In practice, any solid of revolution could be used instead of the disc or cone, if placed axially on the shaft, but would, in effect, be either a disc or a cone.

Figure 4:
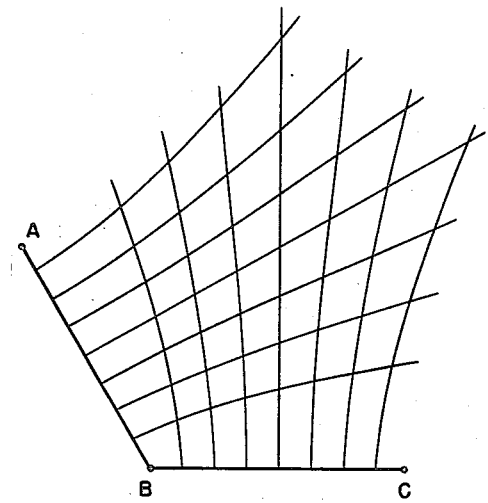
Fig. 4 is a diagram illustrating how a position may be determined from two families of hyperbolas.

It will be understood that theoretically, two hyperbolas can intersect at two points. However, this difficulty is overcome practically by the chioce of transmitters, and the initial adjustment of the equipment with relation to the local geography, so that an area similar to Fig. 4 is dealt with. It will also be understood that the present invention is limited to locales wherein the transmitters are at approximately the same elevation.

Obviously many modifications and variations of the present invention are possible in the light of the above teachings. It is therefore to be understood that within the scope of the appended claims the invention may be practiced otherwise than as specifically described.

What is claimed is:

1. An analogue computer comprising a housing mounted for unrestricted movement in a plane, an axially moveable rod mounted in said housing perpendicularly to said plane, said rod extending through said housing and having a right circular cone mounted on each end thereof, the axes of the cones and rod coinciding, said cones pointing away from said housing, a first pair of discs on one side of and parallel to said plane and in the space in which one of said cones is positionable, said discs being mounted for equal and opposite movement perpendicular to said plane, a second pair of discs on the other side of and parallel to said plane and in the space in which the other of said cones is positionable; the discs of said second pair of discs being mounted for equal and opposite movement perpendicular to said plane, whereby said rod and cones may be translated and moved axially to bring each of said cones into engagement with the two discs corresponding thereto, to thereby establish a position for said rod.

2. An analogue computer as in claim 1, wherein the discs of each pair of discs are tangent when in the same plane.

3. An analogue computer as in claim 2, wherein the discs of each pair have equal radii.

4. An analogue computer as in claim 3 wherein said discs are mounted on screw threaded shafts extending perpendicularly to said plane.

5. An analogue computer comprising a housing mounted for unrestricted movement in a plane, an axially moveable rod mounted in said housing perpendicularly to said plane, said rod extending through said housing and having a right circular cone mounted on each end thereof, the axes of the cones and rod coinciding, said cones pointing away from said housing, a first pair of discs on one side of and parallel to said plane and in the space in which one of said cones is positionable, said discs being mounted on a pair of axially moveable shafts, said shafts being perpendicular to said plane, means to move said shafts equally in opposite directions, a second pair of discs on the other side of and parallel to said plane and in the space in which the other of said cones is positionable, said second pair of discs being mounted on a second pair of axially moveable shafts, said latter mentioned shafts being perpendicular to said plane, the discs of each pair being tangent when in the same plane and the discs of each pair having equal radii, whereby said rod and cones may be translated and moved axially to bring each of said cones into engagement with the two discs corresponding thereto, to thereby establish a position for said rod.

6. An analogue computer comprising a housing unit, first rail means extending in a first direction, said housing unit being mounted for movement along said first rail means, second rail means lying in substantially the same plane as said first rail means and in a direction perpendicular to the direction of said first rail means, said first rail means and housing being moveable along said second rail means, a rod mounted in and extending through said housing for axial movement, the axis of said rod being perpendicular to the plane of said rail means, a right circular cone on each end of the rod, the axis of the cones coinciding with the axis of the rod and the cones pointed away from the housing, a first pair of discs parallel to and below the plane of said rail means, each of said discs being fixedly attached to a screw threaded shaft, said shafts being perpendicular to the plane of said rail means, said discs having equal diameters, the axes of said shafts being spaced apart a distance equal to a diameter of said discs, means to rotate said shafts an equal amount in opposite directions, whereby said discs will be displaced equally in opposite directions, a second pair of discs parallel to and above the plane of said rail means, each of the discs of the second pair being fixedly attached to a screw threaded shaft, said second pair of shafts being perpendicular to the plane of said rail means, the axes of said second pair of shafts being spaced apart a distance equal to a diameter of one of the discs of the second pair of discs, means to rotate the shafts of said second pair of shafts an equal amount in opposite directions, whereby said second pair of discs will be displaced equally in opposite directions, and means to move said rod, said housing and said rail means whereby each of said cones may be brought into contact with a pair of said discs.

7. In a mechanical analogue, a right circular cone supported for free translatory movement within a defined space, a pair of discs within said space in one or more planes perpendicular to the axis of the cone, and means to move the discs into planes whereby the axis of the cone may define a plurality of hyperbolas as the cone is moved when in contact with said discs in different positions thereof parallel to their original planes.

8. In a mechanical analogue, means to trace a hyperbola comprising a pair of tangent discs, a right circular cone in contact with said discs and having its axis perpendicular to the plane of said discs and means to translate said cone so that it remains in contact with said discs, whereby the axis of said cone traces a hyperbola as the cone is moved.

9. In a mechanical analogue, means to trace one or more hyperbolas of a family comprising a pair of tangent, equal radii discs, a right circular cone in contact with said discs and having its axis perpendicular to the plane of said discs, means to translate said cone so that it remains in contact with said discs, and means to selectively move said discs in opposite directions to parallel planes spaced equi-distant from the first mentioned plane.

10. In a mechanical analogue, a right circular cone supported for free translatory and reciprocatory movement in a defined space with the axis thereof always parallel to an original position, a pair of bodies of revolution in said space having axes parallel to the axis of said cone, each of said bodies being supported for equal and opposite movement along the axis thereof.

11. Apparatus according to claim 10, said bodies of revolution being cones.

12. In a mechanical analogue, means to trace a hyperbola comprising a pair of bodies of revolution having their axes mutually parallel and displaced, a right circular cone in contact with said bodies and having its axis parallel to said body axes, and means to translate and reciprocate said cone so that it remains in contact with said bodies, whereby the axis of said cone describes a hyperbola as the cone is moved.

13. The apparatus of claim 12, said bodies of revolution being cones.

14. An analogue computer comprising a housing mounted for unrestricted movement in a plane, an axially moveable rod mounted in said housing perpendicularly to said plane, said rod extending through said housing and having a right circular cone mounted on each end thereof, the axes of the cones and rod coinciding, said cones pointing away from said housing, a first pair of bodies of revolution on one side of said plane in the space in which one of said cones is positionable and having their axes perpendicular to said plane, said bodies being mounted for equal and opposite movement along their respective axes, a second pair of bodies of revolution on the other side of said plane in the space in which the other of said cones is positionable and having their axes perpendicular to said plane, said second pair of bodies being mounted for equal and opposite movement along their respective axes, an axis of one of said first pair of bodies and an axis of one of said second pair of bodies being in line, whereby said rod and cones may be translated and moved axially to bring each of said cones into engagement with the two discs corresponding thereto, to thereby establish a position for said rod.

15. An analogue computer in accordance with claim 14, said bodies of revolutions being cones, said cones all having the same angle.

16. An analogue computer in accordance with claim 15, wherein the bases of each pair of cones are tangent when in the same plane.

17. An analogue computer as in claim 14, wherein said bodies of revolution are mounted on screw threaded shafts, the axis of each of which is coincident with the axis of revolution of the associated body.

18. An analogue computer comprising a housing unit, first rail means extending in a first direction, said housing unit being mounted for movement along said first rail means, second rail means lying in substantially the same plane as said first rail means and in a direction perpendicular to the direction of said first rail means, said first rail means and housing being moveable along said second rail means, a rod mounted in and extending through said housing for axial movement, the axis of said rod being perpendicular to the plane of said rail means, a right circular cone on each end of the rod, the axis of the cones coinciding with the axis of the rod and the cones pointed away from the housing, a first pair of bodies of revolution below the plane of said rail means and having their axes perpendicular to said plane, each of said bodies being fixedly attached to a screw threaded shaft, the axis of each shaft being coincident with the axis of revolution of the body supported thereby, the axes of said shafts being placed apart a distance equal to the maximum diameter of one of said pair of bodies, means to rotate said shafts an equal amount in opposite directions, whereby said bodies will be displaced equally in opposite directions, a second pair of bodies of revolution above the plane of said rail means and having their axes perpendicular to said plane, each of said second pair of bodies being fixedly attached to a screw threaded shaft, the axis of each shaft being coincident with the axis of revolution of the body supported thereby, the axes of said shafts being placed apart a distance equal to the maximum diameter of one of said pair of bodies, means to rotate the shafts of said second pair of bodies of revolution an equal amount in opposite directions, whereby said second pair of bodies will be displaced equally in opposite directions, and means to move said rod, said housing and said rail means whereby each of said cones may be brought into contact with a pair of said bodies.

19. An analogue computer in accordance with claim 18, said bodies of revolution being cones, all of said cones having equal angles, said upper pair of cones pointing down and said lower pair of cones pointing up.

No references cited.